(12) United States Patent  
Bokor et al.

(10) Patent No.: US 9,299,178 B2  
(45) Date of Patent: Mar. 29, 2016

(54) GENERATION OF ANIMATED GESTURE RESPONSES IN A VIRTUAL WORLD

(75) Inventors: Brian Ronald Bokor, Raleigh, NC (US); Andrew Bryan Smith, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1878 days.

(21) Appl. No.: 12/098,240

(22) Filed: Apr. 4, 2008

(65) Prior Publication Data

US 2009/0251471 A1  Oct. 8, 2009

(51) Int. Cl.  
*G06T 13/40*  (2011.01)

(52) U.S. Cl.  
CPC ................................. *G06T 13/40* (2013.01)

(58) Field of Classification Search  
USPC .......................... 707/999.1, 999.003; 715/758  
See application file for complete search history.

(56) References Cited

U.S. PATENT DOCUMENTS

| 5,880,731 A * | 3/1999 | Liles et al. ..................... 715/758 |
| 2004/0225640 A1 * | 11/2004 | Brown et al. .......... 707/999.003 |
| 2007/0136068 A1 * | 6/2007 | Horvitz .......................... 704/270 |
| 2008/0091692 A1 * | 4/2008 | Keith et al. ................ 707/999.1 |

* cited by examiner

*Primary Examiner* — Phi Hoang  
(74) *Attorney, Agent, or Firm* — Moore & Van Allen PLLC

(57) ABSTRACT

Responding to gestures made by third parties in a virtual world by receiving a gesture from a first avatar directed to at least one second avatar. For at least one second avatar, a reply gesture may be selected that corresponds to the received gesture. The reply gesture may be output for communication to the first avatar.

22 Claims, 5 Drawing Sheets

GENERATION OF ANIMATED GESTURE RESPONSES IN A VIRTUAL WORLD

BACKGROUND OF THE INVENTION

The invention relates to simulations, virtual world simulations of the real-world or real-life or a virtual world and the like, and more particularly to a system and method for responding to gestures made by third parties in a virtual world.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents, via their avatar, can explore the virtual world, meet other users or residents, socialize, participate in individual and group activities, create and trade items (virtual property) and receive services from one another.

Virtual worlds are created so as to mimic reality. The users are able to participate in conversations and make gestures to other users that are one or more of visible, audible, or in text form. Despite allowing interaction between users, virtual worlds typically rely on user input to control interaction between users and do not provide for automatic reactions of the user to the virtual environment. In reality, however, human beings typically react automatically to certain gestures made by others during conversation, such as smiling or nodding when said hello to, extending a hand when the other person appears to make a gesture to shake hands, etc. The reactions are generally spontaneous and autonomous. Additionally, there are different guidelines dictating a person's response based on the context or environment in which an interaction with another user is occurring. For example, a person's response to a gesture in a business context may be different from a person's response in a social or friendly setting. As another example, a person's response to a gesture may be different based on cultural differences between users.

BRIEF SUMMARY OF THE INVENTION

In accordance with an aspect of the invention, a method for responding to gestures made by third parties in a virtual world may comprise receiving a gesture from a first avatar directed to at least one second avatar, thereby forming a received gesture. The method may also include, for at least one second avatar, selecting a reply gesture corresponding to the received gesture. The method may also include outputting the reply gesture for communication to the first avatar.

In accordance with another aspect of the invention, a method for responding to gestures made by third parties in a virtual world may comprise receiving a gesture from a first avatar directed to at least one second avatar, thereby forming a received gesture. The method may also include, selecting and outputting a reply gesture corresponding to the received gesture if the first avatar is within a proximity threshold of the second avatar.

In accordance with one aspect of the invention, the proximity threshold may be a distance value, while in another aspect, the proximity threshold represents an environment of either one or both the first and second avatars, or spatial dimension, such as a virtual room, sphere, etc. In accordance with one aspect of the invention, various reply gestures may be categorized for providing different reply gestures based on the context within which the received gesture was sent by the other party.

In accordance with one aspect of the invention, a computer program product for responding to gestures made by third parties may comprise a computer readable medium having computer readable program code embodied therein. The computer readable medium may computer readable program code configured to receive a gesture to be made by a first avatar directed to at least one second avatar, thereby forming a received gesture. The computer readable medium may further comprise computer readable program code configured to, for at least one second avatar, select a reply gesture corresponding to the received gesture and computer readable program code configured to output the reply gesture for communication to the first avatar.

Other aspects and features of the invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
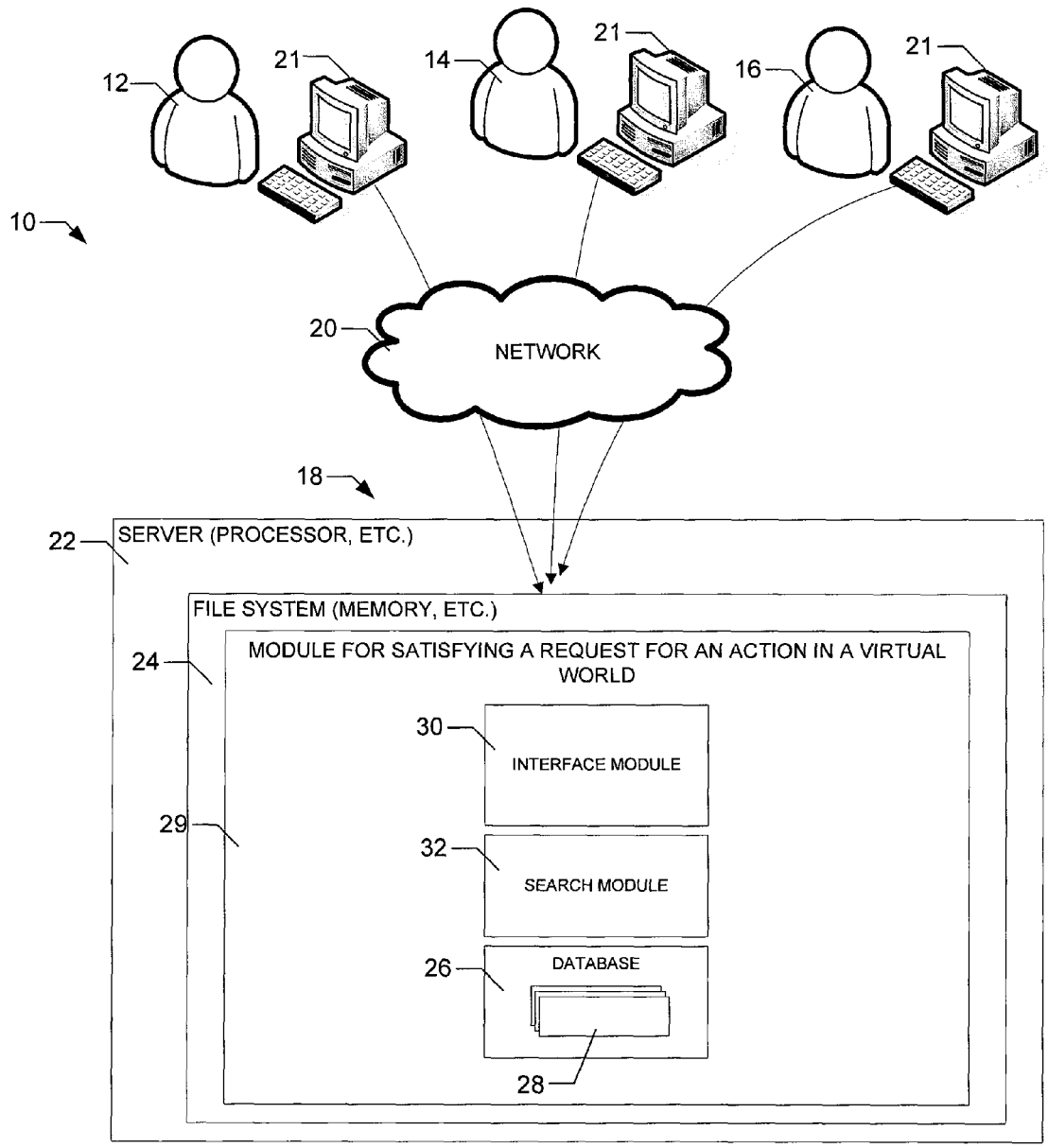
FIG. 1 is a block schematic diagram of an example of a system for generating animated gesture responses in a virtual world in accordance with an embodiment of the invention.

The following detailed description of embodiments refers to the accompanying drawings, which illustrate specific embodiments of the invention. Other embodiments having different structures and operations do not depart from the scope of the invention.

As will be appreciated by one of skill in the art, the invention may be embodied as a method, system, or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Aspects of the invention provide systems, methods, and computer program products for generating a reply gesture from a second user in response to a gesture received from a first user in a virtual world. Depending on the embodiment, the reply gesture may be made at the behest of the second user or may be an automatic reply from the second user without input from the second user. In effect, the systems, methods, and computer program products of the invention generate reply gestures in response to received gestures from others so as to more closely mimic human interaction, where certain queues and gestures made by one person are automatically or autonomously responded to by another person during conversation or interaction in a virtual world setting.

FIG. 1 is a block schematic diagram depicting a general embodiment of an environment 10 in which the systems, methods, and computer program products of the invention may be implemented according to one embodiment. As illustrated, a plurality of users 12-16 may be connected to a network 20, such as the Internet, LAN, WAN, etc. The users 12-16 interact with a virtual world system 18. In particular, the virtual world system 18 operates one or more virtual worlds in which users may create one or more virtual personalities, sometimes referred to as avatars. The users, via their computers 21, are capable of controlling their avatars to communicate with each other in various virtual scenarios. In general, users provide commands to the virtual world system 18 dictating various environments and situations to place their avatar(s) in and to control the actions and movements of the avatar(s). The virtual world system 18 receives these inputs and generates various graphic user interfaces to be displayed on each user's computer. Where users interact with each other in the virtual world, the virtual world system 18 displays scenes from the users' interactions on all users' computers.

As illustrated, the virtual world system 18 is typically implemented as a server accessible via a network 20. This however, could include peer-to-peer type network configurations without a central host. (FIG. 1 depicts only one possible embodiment for configuration of the virtual world system). The virtual world system 18 may include a server/processor 22 that operates using various software modules 29 stored in a file system 24 to create and operate the virtual world. The virtual world system 18 also includes data stored in the file system 24 typically in a database 26.

To implement the invention, in one embodiment, the database 26 of the virtual world system 18 comprises data records 28 for each user and each avatar for each user, if the user has more than one avatar. Stored for each avatar is a list of reply gestures associated with potential input gestures or queues that may be received from a third party in the virtual world. The reply gestures are a series of commands input to the processor for controlling the animation and speech of the avatar to create a visual response by the avatar to the received gesture. In other embodiments, the reply gestures include pointers or other indicators that indicate the commands to use to create and display the reply gesture.

For example, if a first avatar were to direct a nod and hello to a second avatar, the database would include an appropriate reply gesture stored for the second avatar and corresponding to this gesture. The commands for the reply gesture would be provided to the server/processor, which would, in turn, create displays on the computers 21 of the users 12 and 14 associated with the first and second avatars illustrating the second avatar's reply gesture. In some embodiments, the reply gesture is displayed automatically without input by the second user so as to emulate autonomic reactions of users in real life.

The reply gestures may be organized in different ways. In its simplest form, for each possible gesture that may be received from a third party, there is provided a corresponding reply gesture as a response. However, the number and types of reply responses for any given received gesture can be many. A user may wish to create a series of possible reply gestures for each received gesture, where the reply to be used depends on one or more of: the avatars with whom the interaction is occurring, the environment or social setting in which the interaction is occurring, time of day, year, etc., cultural differences between the avatars or users, etc.

For example, a user may create different reply gestures for use with friends or a particular individual that may be different than those with a more general acquaintance. Similarly, a user may use different reply gestures for individuals hierarchically above them, such as a boss. Similarly, a user may use different reply gestures based on the social environment, choosing more formal gestures in a business setting than in a social setting. The user may also use different gestures based on the cultural and/or ethnic orientation of the user's avatar and/or the particular avatar with which the user is communicating.

In some embodiments, the user may also use a proximity threshold. The proximity threshold can be used as a filter. Gestures made by users at a distance from the user's avatars may not warrant a reply gesture. The proximity threshold may be a general threshold to use with all received gestures from third parties, or it may be selectable based on who is sending the gesture, the type of gesture, the current environment or social setting, cultural norms, etc. For example, the user may set an individual proximity threshold for each possible received gesture, a proximity threshold to use with a class or category of gestures, a proximity threshold to use with particular third party users or avatars, individualized proximity thresholds to use in different environments or social settings, or to account for cultural differences between users, etc.

It must be understood, that the proximity threshold is not necessarily a defined distance, such as five (5) feet, between the avatars. The proximity threshold could be a two or three-dimensional spatial setting, such as within a given sphere or within a room or within a given environment, etc.

A user may store reply gestures in one or more databases 26 and data records 28 for one or more of that user's avatars in order to respond to any number of avatars in the virtual world. The databases may contain default settings that can be changed by the user. An example of a database storing avatar reply gestures for a particular user is shown below in Table 1:

TABLE 1

Example of a possible database for reply gestures

| AVATAR | PERSON | ENVIRONMENT | CULTURE | PROXIMITY | GESTURE RECEIVED | TIME OF DAY | GESTURE RESPONSE |
|---|---|---|---|---|---|---|---|
| AV1 | Boss | Social | America | Inside 10 ft. | "Hello" | Anytime | "Hey, How are you?" |
| | | | | Inside the same room | Smile & "Hello" | Anytime | Waive & "Hello" |
| | | | | Outside 50 ft. | Waive "Hello" | Anytime | Do Nothing |
| | | Business | America | Between 5 ft. and 20 ft. | | Morning | "Good Morning Sir" |
| | | | | | | Afternoon | "Good Afternoon Sir" |
| | | | | | | Night | "Good Night Sir" |
| | | | | | "Good Night" | Night | "Have a good Evening" |
| | | | | Within 5 ft | "Hello" | Anytime | "Hello" & handshake |
| | | | Japan | Inside 20 ft. | "Hello" | Anytime | "Konnichiwa" |
| | John Doe | Any Setting | America | Within 10 ft. | "Hey Man" | Anytime | "What's Up?" |
| | | | | Five | Five | Anytime | Five |
| | | | | Any Distance | Smile | | Smile |
| AV2 | Friend | Any Setting | Japan | Any Distance | "Hi" | Anytime | "Konnichiwa" |
| AV3 | Stranger - Male | Any Setting | Any Country | On Street | "Hi" | Anytime | "Hello" |
| | | | | | Smile | Anytime | Nod |
| | Stranger - Female | Business | Any Country | Any location | Smile | Anytime | Smile |

As illustrated in FIG. 1, the virtual world system 18 may include various modules for implementing the invention. In addition to the server/processor 22 and file management system 24, the system may also include an interface module 30 for controlling communications with the users and displaying graphic user interfaces on the users' computers. The system may include a search engine module 32 for accessing the database and retrieving of reply gestures.

Figure 2:
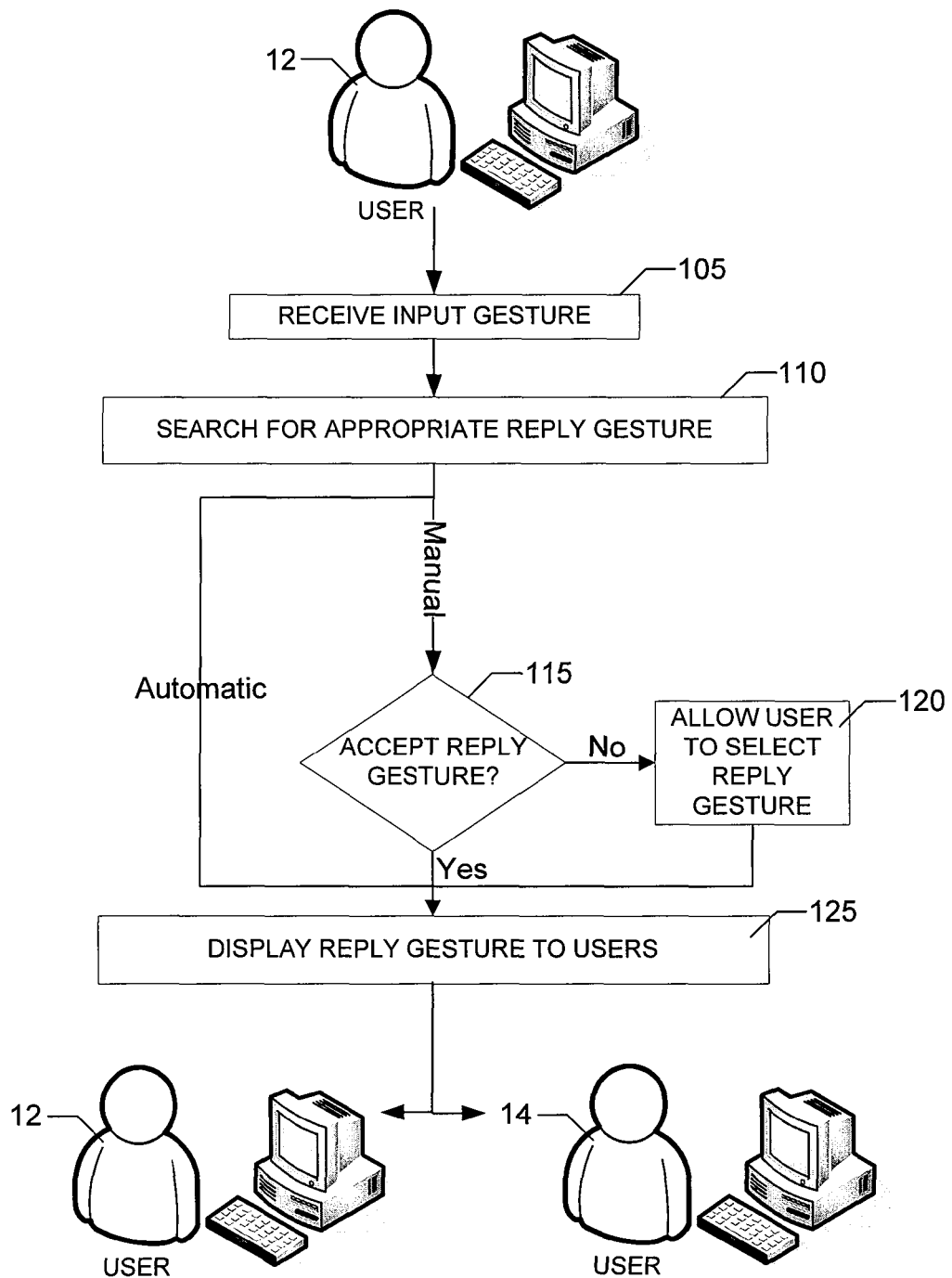
FIG. 2 is a flow chart of an example of a method for generating animated gesture responses in a virtual world by identifying the input gesture, then responding with the stored corresponding reply gesture in accordance with an embodiment of the invention.

FIG. 2, represents a flow chart of one embodiment of the method of generating an animated gesture response. A first user 12 initiates a gesture on his/her computer for his/her first avatar to make a gesture to a second avatar. As illustrated in block 105, the interface module then receives the gesture from the first avatar that is directed to the second avatar. The search module then searches the database for a reply gesture for the second avatar to make to the first avatar based on the received gesture from the first avatar, as shown in block 110.

In an optional manual mode, the interface module may prompt the second user that the second avatar is being commanded to respond to the first avatar with the reply gesture that is stored in the database. (See block 115). Under this manual mode, the second user can either accept or decline to send the reply gesture that is stored in the database. If the second user declines to send the stored reply gesture, then the second user may select a different reply gesture, as seen in block 120. If the user selects a different reply gesture, the search module will find the selected reply from the database and transmit for display to the interface module, as seen in block 125. If however, the second user accepts the initial reply gesture that is stored in the database, then the interface module displays the reply gesture for the second avatar on the display screens of the first and second users, as seen in block 125.

Typically, as in one embodiment of the invention, the steps shown in blocks 115 and 120 will not occur. Instead, the reply gesture from the second avatar will be an automatic response to the gesture from the first avatar. In block 110, the interface module will send the reply gesture that is retrieved from the database by the search module directly to the display screens of the first and second users automatically, as seen in block 125.

Figure 3:
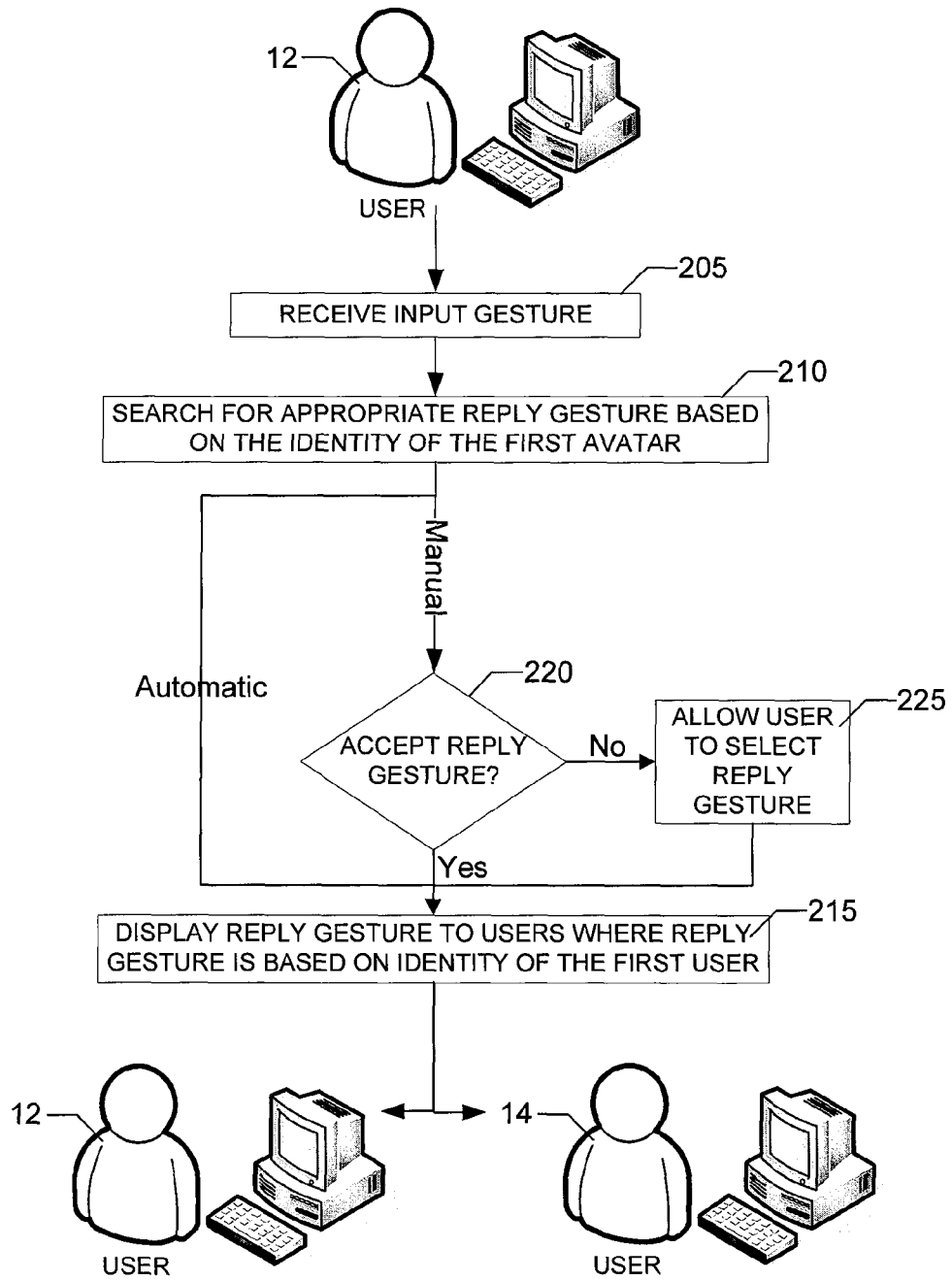
FIG. 3 is a flow chart of an example of a method for generating animated gesture responses in a virtual world by identifying the input gesture and the avatar making the gesture, then responding with the stored corresponding reply gesture in accordance with an embodiment of the invention.

FIG. 3, represents a flow chart of one embodiment of the method of generating an animated gesture response that includes using the identity of the avatar(s) making the initial gesture to determine the reply gesture to be used by the avatar receiving the gesture. In this embodiment, either there are general reply gestures stored in the database for use in responding to gestures from the first avatar, and/or the user associated with the second avatar may have stored one or more specific gestures to use when responding to the first avatar.

A first user initiates a gesture on his/her computer for his/her first avatar to make a gesture to a second avatar. The interface module receives the gesture from the first avatar directed to the second avatar and inputs the parameters to the search module, as seen in block 205. The parameters input include the gesture received and the identity of the first avatar. As illustrated by block 210 the search module then searches the database for records relating to the first avatar indicating the reply gesture to use when corresponding with the first avatar. Typically, there will be customized reply gestures stored under the second avatar to be used when the second avatar communicates with the first avatar.

The search module will send the corresponding reply gesture from the database to the interface module. As illustrated in block 215 the interface module will then display the reply gesture for the second avatar to the display screen of the first and second users. If the search module has not found a reply that is specific to the first avatar, it will either use the standard replies associated with the second avatar or use standard replies from the general database of reply gestures. As shown by blocks 220 and 225, the display of the reply gesture may either be automatic or the system may allow the second user associated with the second avatar to approve the reply gesture prior to implementation.

Figure 4:
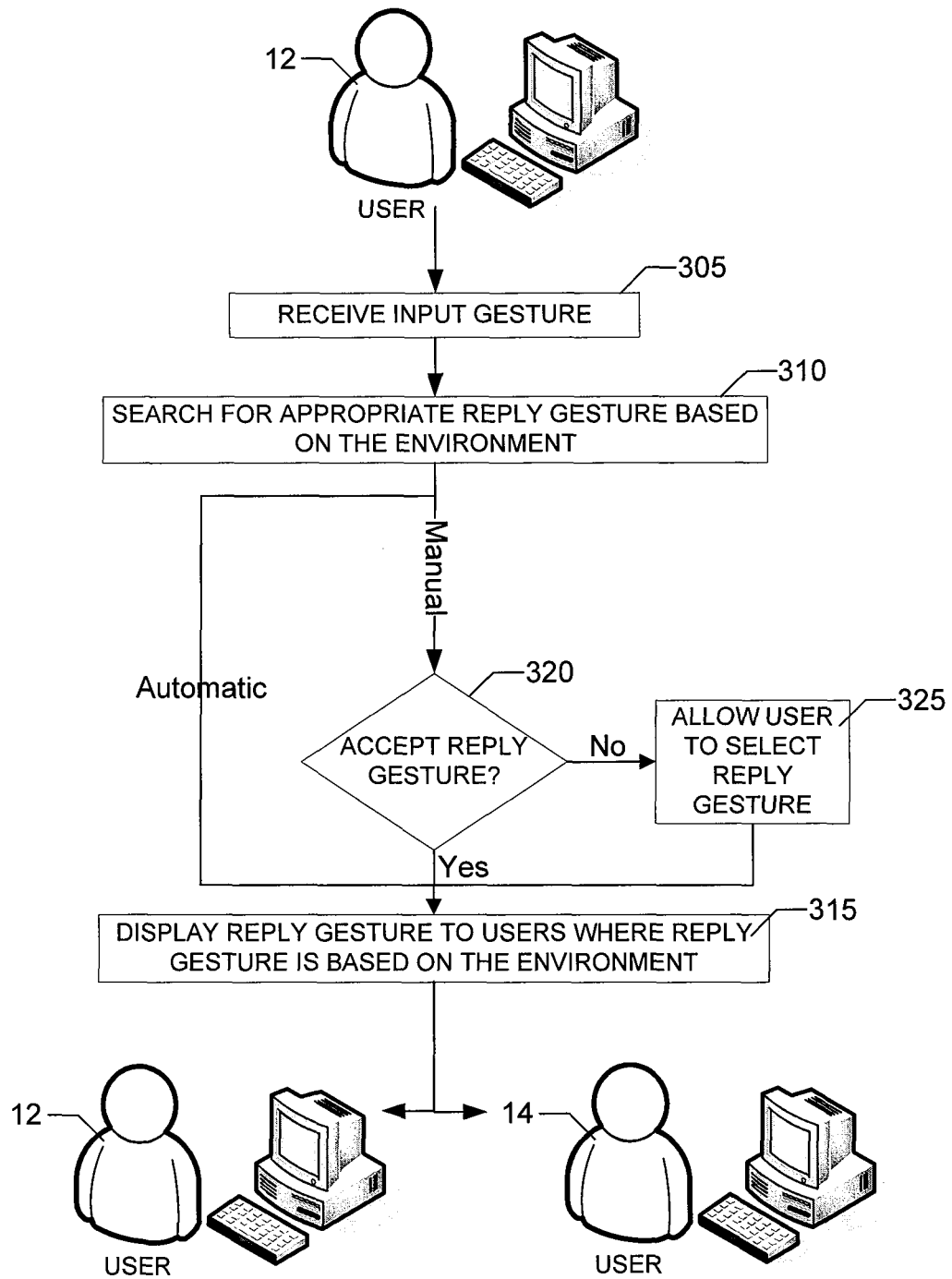
FIG. 4 is a flow chart of an example of a method for generating animated gesture responses in a virtual world by identifying the input gesture and the environment in which the gesture was made, then responding with the stored corresponding reply gesture in accordance with an embodiment of the invention.

FIG. 4, represents a flow chart of one embodiment of the method of generating an animated gesture response that includes using the environment, (e.g., business or social), in which the first and/or second avatar is located to determine the reply gesture to be used by the second avatar receiving the gesture. In this embodiment, either there are general reply gestures stored in the database for use in responding to gestures from the first avatar based on the particular environment, and/or the user associated with the second avatar may have stored one or more specific gestures to use when responding in the specific environment.

A first user initiates a gesture on his/her computer for his/her first avatar to make a gesture to a second avatar. The interface module receives the gesture from the first avatar directed to the second avatar and inputs the parameters to the search module, as seen in block 305. The parameters input include the gesture received and the environment associated with the first and/or second avatar. As illustrated by block 310, the search module then searches the database for records indicating the reply gesture to use in response to the received gesture and the environment. Typically, there will be customized reply gestures stored for the second avatar to be used when the second avatar communicates with the first avatar.

The search module will send the corresponding reply gesture from the database to the interface module. As illustrated in block 315 the interface module will then display the reply gesture for the second avatar to the display screen of the first and second users. If the search module has not found a reply that is specific to the first avatar, it will either use the standard replies associated with the second avatar or use standard replies from the general database of reply gestures. As shown by blocks 320 and 325, the display of the reply gesture may either be automatic or the system may allow the second user associated with the second avatar to approve the reply gesture prior to implementation.

Figure 5:
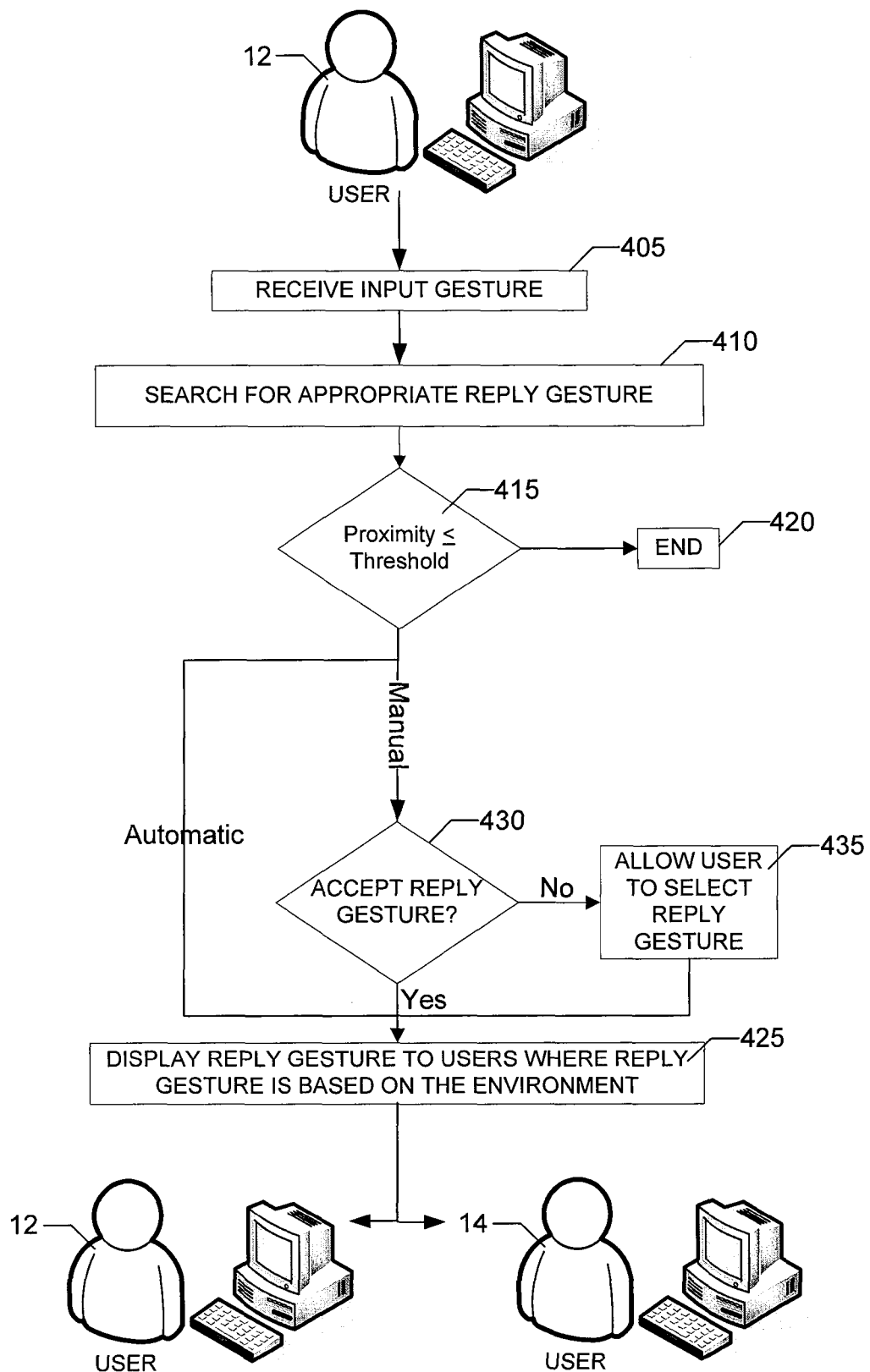
FIG. 5 is a flow chart of an example of a method for generating animated gesture responses in a virtual world by identifying the input gesture and the proximity threshold of the avatar making the gesture, then responding with the stored corresponding reply gesture in accordance with an embodiment of the invention.

FIG. 5, represents a flow chart of one embodiment of the method of generating an animated gesture response that includes using a proximity threshold from the avatar making the initial gesture. A first user initiates a gesture on his/her computer for his/her first avatar to make a gesture to a second avatar. As illustrated in block 405, the interface module then receives the gesture from the first avatar that is directed to the second avatar. The search module searches the database for a reply gesture for the second avatar that corresponds to the initial gesture made by the first avatar, as shown in block 410.

The search module will search the database to determine if the reply gesture has an associated proximity threshold. The interface module will determine the first avatar's proximity and compare the proximity value to a threshold proximity, as illustrated in block 415. As illustrated in block 420, if the first avatar's proximity is outside of the proximity threshold associated with the reply gesture, then the interface module will do nothing. If however, the first avatar's proximity is equal to or within the proximity threshold associated with the reply gesture, as seen in block 425, the interface module will display the reply gesture for the second avatar on the display screens of the first and second users. As shown by blocks 430 and 435, the display of the reply gesture may either be automatic or the system may allow the second user associated with the second avatar to approve the reply gesture prior to implementation.

It is understood that the proximity threshold or parameter can mean a multitude of distance parameters. It could be a general proximity threshold that could be as simple as measuring a distance from the avatar compared to a stored distance that will merit a reply gesture when the proximity threshold is at or within the stored distance. The proximity threshold could be a spatial distance such as a sphere or a virtual room, where in the case of a virtual room the actual distance of the proximity threshold would change based on the size of the room in which the avatar is located. In addition, the proximity threshold could be set by the user for each avatar at various distances or spatial parameters based on the identity of the first avatar, each possible received gesture, the environment, the time of day, etc.

FIGS. 3-5 illustrate independent embodiments that determine the reply gesture based on one of the identity of the user, environment, and proximity. It is understood that the invention is capable of using multiple parameters to determine the reply, such as combinations of the identity of the user, environment, and proximity. In other embodiments other parameters besides identity, environment, and proximity may be used for supplying response gestures, such as the culture where the avatars are located, or the culture of the avatar making the gesture regardless of location, or the time of day the gesture is made, as well as numerous other parameters.

The above embodiments, illustrate interactions between first and second avatars. It must be understood, that the invention is capable of generating reply gestures for more than one avatar at a time. For example, the first avatar may provide a gesture to a group of avatars. Under this scenario, the invention will determine proper reply gestures, which may be different for different avatars, and display the gestures to each user.

A gesture may include any visual, textual or oral communication or gesture in a virtual world that an avatar may perform or which may be performed for an avatar. Examples of a gesture may include, but are not limited to, extending a hand, bowing, saying "hello", waving, winking, writing out "hello", etc.

All of these embodiments show a method to generate a response gesture between two users each with one avatar. However, it is understood that these methods can be preformed to receive a number of gestures from a number of avatars for one or more users, and allow the users of the avatars who receive the gestures to respond to one or more avatars automatically based on identity, environment, proximity, or other parameters by selecting predetermined reply gestures.

In addition, it is important to note that not only may a user enter specific automated gesture responses, but the gesture responses may be a set of default replies provided by the virtual world in which the avatar is operating. Additionally, specific areas within the virtual world may have its own set of default gesture responses different from other areas within the same virtual world. The user may use the default settings or where allowed by the virtual world or other areas within the virtual world may change the default settings for the reply gestures.

It is understood that the methods shown in the embodiments are only a few examples of the order of steps that could be used to generate animated response gestures. It is understood that the same results may be obtained by changing the order of operation for searching and storing the various parameters used to determine the reply gestures.

The flowcharts and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the invention. The following claims are in no way intended to limit the scope of the invention to the specific embodiments described herein.

What is claimed is:

1. A method for responding to gestures made by third parties in a virtual world, comprising:
   receiving a first gesture to be made by a first avatar directed to at least one second avatar, thereby forming a first received gesture;
   receiving a second gesture to be made by a third avatar directed to the at least one second avatar in a specific area of the virtual world, thereby forming a second received gesture;
   accessing a database comprising a first reply gesture and a second reply gesture, wherein the first reply gesture corresponds to at least one unique set of criteria, wherein each set of criteria comprises at least one user-defined criterion and a received gesture criterion in addition to the user-defined criterion and the second reply gesture corresponds to a set of default gestures that are based on the specific area of the virtual world;
   for the at least one second avatar, selecting the first reply gesture from the database corresponding to one of the unique sets of criteria based on at least a time period associated with the first received gesture, wherein the second reply gesture is different from the first reply gesture; and
   simultaneously outputting the first reply gesture for communication to the first avatar and the second reply gesture for communication to the third avatar.

2. The method of claim 1, wherein selecting a reply gesture corresponding to the received gesture occurs automatically upon receipt of the received gesture from the first avatar.

3. The method of claim 1, wherein selecting a reply gesture corresponding to the received gesture occurs if a proximity of the first avatar to the second avatar is within a proximity threshold.

4. The method of claim 3, wherein the proximity threshold comprises a distance value, and wherein selecting a reply gesture corresponding to the received gesture occurs if the distance between the first and second avatars is within the proximity threshold.

5. The method of claim 3, wherein the proximity threshold comprises a defined environment surrounding the second avatar, and wherein selecting a reply gesture corresponding to the received gesture occurs if the proximity of the first avatar to the second avatar is within the proximity threshold.

6. The method of claim 1, wherein the reply gestures are categorized into different classes, and wherein selecting a reply gesture corresponding to the received gesture comprises selecting a reply gesture from the different classes.

7. The method of claim 1, wherein the reply gestures are categorized into different avatar defined classes, and wherein selecting a reply gesture corresponding to the received gesture comprises selecting a reply gesture from the different avatar defined classes.

8. The method of claim 1, wherein the reply gestures are categorized based on different social environments, and wherein selecting a reply gesture corresponding to the received gesture comprises selecting a reply gesture categorized based on the different social environments.

9. The method of claim 8, further comprising receiving information regarding a social environment of either one or both the first and second avatars, and wherein selecting a reply gesture corresponding to the received gesture further comprises selecting the reply gesture that corresponds to the social environment of at least one of the first and second avatars.

10. The method of claim 1, wherein the reply gestures are categorized based on different social environments comprising at least one of a business, cultural, and personal environment, and wherein selecting a reply gesture corresponding to the received gesture comprises selecting a reply gesture categorized based on the different social environments.

11. A method for responding to gestures made by third parties in a virtual world, comprising:
receiving a first gesture to be made by a first avatar directed to at least one second avatar, thereby forming a first received gesture;
receiving a second gesture to be made by a third avatar directed to the at least one second avatar in a specific area of the virtual world, thereby forming a second received gesture;
accessing a database comprising a first reply gesture and a second reply gesture, wherein the first reply gesture corresponds to at least one unique set of criteria, wherein each set of criteria comprises at least one user-defined criterion and a received gesture criterion in addition to the user-defined criterion and the second reply gesture correspond to a set of default gestures that is based on the specific area of the virtual world;
for the at least one second avatar, selecting the first reply gesture from the database corresponding to one of the unique sets of criteria if a proximity of the first avatar to the second avatar is within a proximity threshold, the proximity threshold being adjustable based on the size of an environment, wherein the second reply gesture is different from the first reply gesture; and
simultaneously outputting the first reply gesture for communication to the first avatar and the second reply gesture for communication to the third avatar.

12. The method of claim 11, wherein the proximity threshold comprises a distance value, and wherein selecting a reply gesture corresponding to the received gesture occurs if the distance between the first and second avatars is within the proximity threshold.

13. The method of claim 11, wherein the proximity threshold comprises a defined environment surrounding the second avatar, and wherein selecting a reply gesture corresponding to the received gesture occurs if the proximity of the first avatar to the second avatar is within the proximity threshold.

14. The method of claim 11, further comprising receiving information regarding a social environment of either one or both the first and second avatars, and wherein selecting a reply gesture corresponding to the received gesture further comprises selecting a reply gesture that corresponds to the social environment of at least one of the first and second avatars.

15. The method of claim 11, wherein the reply gestures are categorized into different classes, and wherein selecting a reply gesture corresponding to the received gesture comprises selecting a reply gesture from the different classes.

16. A computer program product for responding to gestures made by third parties in a virtual world, the computer program product comprising:
a computer readable storage medium device having computer readable program code embodied therein, the computer readable storage medium comprising:
computer readable program code configured to receive a first gesture to be made by a first avatar directed to at least one second avatar, thereby forming a received gesture;
computer readable program code configured to receive a second gesture to be made by a third avatar directed to the at least one second avatar in a specific area of the virtual world, thereby forming a received gesture;
computer readable program code configured to access a database comprising a first reply gesture and a second reply gesture, wherein the first reply gesture corresponds to at least one unique set of criteria, wherein each set of criteria comprises at least one user-defined criterion and a received gesture criterion in addition to the user-defined criterion and the second reply gesture corresponds to a set of default gestures that are based on the specific area of the virtual world;
computer readable program code configured to, for the at least one second avatar, select the first reply gesture from the database corresponding to one of the unique sets of criteria based on at least a time period associated with the received gesture, wherein the second reply gesture is different from the first reply gesture; and
computer readable program code configured to simultaneously output the first reply gesture for communication to the first avatar and the second reply gesture for communication to the third avatar.

17. The computer program product of claim 16, wherein said computer readable program code configured to, for at least one second avatar, select a reply gesture corresponding to the received gesture is configured to automatically select a reply gesture corresponding to the received gesture upon receipt of the received gesture from the first avatar.

18. The computer program product of claim 16, wherein said computer readable program code configured to, for at least one second avatar, select a reply gesture corresponding to the received gesture is configured to select a reply gesture corresponding to the received gesture if a proximity of the first avatar to the second avatar is within a proximity threshold.

19. The computer program product of claim 16, wherein said computer readable program code configured to, for at least one second avatar, select a reply gesture corresponding to the received gesture is configured to select a reply gesture corresponding to the received gesture if a proximity of the first avatar to the second avatar is within a proximity threshold, wherein the proximity threshold comprises a distance value.

20. The computer program product of claim 16, wherein said computer readable program code configured to, for at least one second avatar, select a reply gesture corresponding to the received gesture is configured to select a reply gesture corresponding to the received gesture if a proximity of the first avatar to the second avatar is within a proximity threshold, wherein the proximity threshold comprises a defined environment surrounding the second avatar.

21. The computer program product of claim 16 further comprising computer readable program code configured to receive information regarding a social environment of either one or both the first and second avatars, and wherein said computer readable program code configured to, for at least one second avatar, select a reply gesture corresponding to the received gesture is configured to select a reply gesture that corresponds to the social environment of at least one of the first and second avatars.

22. An apparatus for responding to gestures made by third parties in a virtual world, comprising:
a processor capable of:
receiving a first gesture to be made by a first avatar directed to at least one second avatar, thereby forming a received gesture;
receiving a second gesture to be made by a third avatar directed to the at least one second avatar in a specific area of the virtual world, thereby forming a received gesture;
accessing a database comprising a first reply gesture and a second reply gesture, wherein the first reply gesture corresponds to at least one unique set of criteria, wherein each set of criteria comprises at least one user-defined criterion and a received gesture criterion in addition to the user-defined criterion and the second reply gesture corresponds to a set of default gestures that are based on the specific area of the virtual world;
for at least one second avatar, selecting the first reply gesture from the database corresponding to one of the unique sets of criteria based on at least a time period associated with the received gesture, wherein the second reply gesture is different from the first reply gesture; and
simultaneously outputting the first reply gesture for communication to the first avatar and the second reply gesture for communication to the third avatar.

\* \* \* \* \*